(12) United States Patent
Chang

(10) Patent No.: US 8,854,209 B2
(45) Date of Patent: Oct. 7, 2014

(54) WARNING TAG AND METHOD FOR PROVIDING AN INDICATION RELEVANT TO SHELF LIFE OF A PRODUCT

(75) Inventor: Yao-Tsung Chang, New Taipei (TW)

(73) Assignee: Wistron Corporation, New Taipei (TW)

(*) Notice: Subject to any disclaimer, the term of this patent is extended or adjusted under 35 U.S.C. 154(b) by 296 days.

(21) Appl. No.: 13/362,137

(22) Filed: Jan. 31, 2012

(65) Prior Publication Data

US 2012/0218105 A1    Aug. 30, 2012

(30) Foreign Application Priority Data

Feb. 25, 2011    (TW) .............................. 100106438 A

(51) Int. Cl.
- G08B 21/00 (2006.01)
- G06K 19/07 (2006.01)
- G07C 1/00 (2006.01)
- G04C 23/16 (2006.01)
- G04G 15/00 (2006.01)

(52) U.S. Cl.
CPC *G06K 19/07* (2013.01); *G07C 1/00* (2013.01); *G04C 23/16* (2013.01); *G04G 15/003* (2013.01)
USPC .......................... 340/540; 340/309.16; 368/10

(58) Field of Classification Search
CPC .................................. G04F 1/005; G07C 1/00
USPC .................... 340/540, 539.19, 309.16, 309.7; 368/10, 243; 702/177
See application file for complete search history.

(56) References Cited

U.S. PATENT DOCUMENTS

| | | | |
|---|---|---|---|
| 6,337,836 B1* | 1/2002 | Eidelson | 368/10 |
| 6,691,058 B2* | 2/2004 | Blakley | 702/177 |
| 6,826,119 B2* | 11/2004 | Fortune | 368/10 |
| 7,248,147 B2* | 7/2007 | Debord et al. | 340/309.16 |
| 7,532,106 B2* | 5/2009 | Debord et al. | 340/309.16 |
| 2008/0167976 A1 | 7/2008 | Chuang et al. | |

FOREIGN PATENT DOCUMENTS

| | | |
|---|---|---|
| TW | 200830133 | 7/2008 |
| TW | 200742710 | 11/2008 |
| TW | M349533 | 1/2009 |

OTHER PUBLICATIONS

Office action dated Oct. 29, 2013 from corresponding Taiwanese Patent Application No. 100106438 and its English translation of the sections boxed in red by the clients.

* cited by examiner

*Primary Examiner* — John A Tweel, Jr.
(74) *Attorney, Agent, or Firm* — Ladas & Parry, LLP

(57) ABSTRACT

A warning tag for providing an indication relevant to shelf life of a product is to be disposed on a product. The warning tag includes a storage unit, a clock unit, a control unit and a warning unit. The storage unit stores product information of the product. The product information includes time data associated with end of the shelf life of the product. The clock unit generates a current time. The control unit is electrically coupled to the storage unit and the clock unit, and outputs a warning signal based on the current time and the end of the shelf life of the product. The warning unit is electrically coupled to the control unit, and generates the indication according to the warning signal.

4 Claims, 3 Drawing Sheets

WARNING TAG AND METHOD FOR PROVIDING AN INDICATION RELEVANT TO SHELF LIFE OF A PRODUCT

CROSS-REFERENCE TO RELATED APPLICATION

This application claims priority of Taiwanese Patent Application No. 100106438, filed on Feb. 25, 2011, and the disclosure of which is incorporated herein by reference.

BACKGROUND OF THE INVENTION

1. Field of the Invention

The present invention relates to a warning tag, more particularly to a warning tag for providing an indication relevant to shelf life of a product.

2. Description of the Related Art

Currently, all kinds of products sold in a convenience store or in a hypermarket are mostly stuck with merchandise labels. The merchandise labels indicate product names, product origins, manufacturing dates, shelf life, etc., such that consumers may clearly understand information about the products.

To know whether these products are at the end of their shelf lives, it is required to rely upon consumer's self inspection of the merchandise labels. However, it is unavoidable that consumers may neglect or fail to notice the shelf life, such that the consumers may have misgivings about safety relevant to product use or consumption. One of current preventive measures is to print the manufacturing date and the shelf life in a form of a bar code. When consumers purchase a product, they may determine, through a barcode reader, whether this product is at the end of the shelf life or not so that a merchant may avoid selling products that have reached the end of the shelf life.

Even though the current preventive measure may prevent consumers from buying products that have reached the end of the shelf life, the consumer determines whether the products have reached the end of the shelf life merely through the barcode reader when paying for the products. After keeping a purchased product for some time, the consumer is still under a risk of consuming products that have reached the end of the shelf life.

SUMMARY OF THE INVENTION

Therefore, an object of the present invention is to provide a warning tag for providing an indication relevant to shelf life of a product to actively warn a consumer about a state of the product relevant to the shelf life.

Accordingly, the warning tag of this invention comprises a storage unit, a clock unit, a control unit and a warning unit. The storage unit is for storing product information of the product. The product information includes time data associated with end of the shelf life of the product. The clock unit is for generating a current time. The control unit is electrically coupled to the storage unit and the clock unit, and outputs a warning signal based on the current time and the time data. The warning unit is electrically coupled to the control unit, and generates the indication according to the warning signal. In this way, the indication is generated when the current time approaches or has exceeded the end of the shelf life of the product so as to achieve an effect of warning a consumer.

More particularly, the control unit outputs the warning signal for controlling the warning unit to generate the indication when the current time corresponds to an about-to-end time which approaches but does not exceed the end of the shelf life of the product or when the current time corresponds to or has exceeded the end of the shelf life of the product.

The warning unit includes a display module for displaying the product information. The display module may include a flexible display. The control unit controls the flexible display to display the time data associated with the end of the shelf life of the product in a first mode when the current time corresponds to or has exceeded the end of the shelf life of the product. The control unit further controls the flexible display to display the time data associated with the end of the shelf life of the product in a second mode when the current time corresponds to the about-to-end time. It should be noted here that the flexible display is an electronic paper or any other flexible display.

The warning unit may include an audio module electrically coupled to the control unit. The control unit outputs the warning signal for controlling the audio module to generate the indication in an audible form when the current time corresponds to the about-to-end time or when the current time corresponds to or has exceeded the end of the shelf life of the product.

The clock unit may be a real-time clock (RTC). Further, the storage unit may be integrated into the real-time clock.

Another object of the present invention is to provide a method for providing an indication relevant to shelf life of a product.

Accordingly, the method of this invention is to be implemented by a warning tag disposed on the product.

The method comprises:

(A) accessing time data associated with end of the shelf life of the product, and a current time;

(B) making a first determination as to whether the current time corresponds to or has exceeded the end of the shelf life of the product;

(C) configuring the warning tag to generate the indication in a first mode when a result of the first determination is affirmative;

(D) when the result of the first determination is negative, making a second determination as to whether the current time corresponds to an about-to-end time which approaches but does not exceed the end of the shelf life of the product; and (E) configuring the warning tag to generate the indication in a second mode when a result of the second determination is affirmative.

The method further comprises, prior to step (A):

(F) configuring the warning tag to keep track of time so as to generate the current time, and proceeding to step (A) when the current time generated by the warning tag matches a preset time.

The method further comprises, after step (E):

(G) resetting the preset time and configuring the warning tag to perform step (F).

Furthermore, in step (D), step (G) is performed when the current time does not correspond to the about-to-end time.

The effect of the present invention resides in that the warning tag disposed on the product may actively detect the product shelf life, and may generate the indication when the current time approaches or has exceeded the end of the shelf life of the product, so as to warn the consumer about the shelf life of the product.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE EMBODIMENTS

Figure 1:
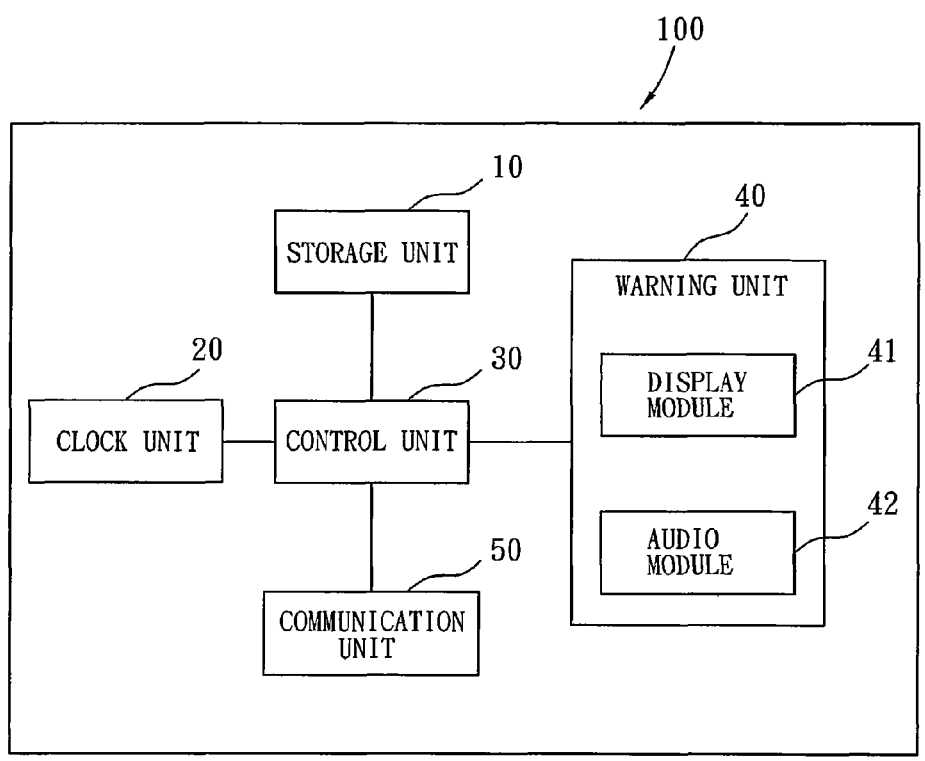
FIG. 1 is a block diagram illustrating the embodiments of a warning tag, which is for providing an indication relevant to shelf life of a product, according to the present invention.

Referring to FIG. 1, a first embodiment of a warning tag 100 for providing an indication relevant to shelf life of a product is illustrated. The warning tag 100 is to be disposed on a product, and is for outputting the indication when the product approaches or is at the end of the shelf life of the product so as to actively warn a consumer about a state of the product relevant to the shelf life.

The warning tag 100 comprises a storage unit 10, a clock unit 20, a control unit 30 and a warning unit 40. The storage unit 10 is a memory module for storing product information of the product. The product information includes time data associated with the end of the shelf life of the product. The clock unit 20 is a real-time clock (RTC) which includes an energy storage element, such as a battery or a capacitor, and is capable of keeping track of time so as to generate a current time. The control unit 30 is electrically coupled to the storage unit 10 and the clock unit 20. The control unit 30 outputs a warning signal based on the current time and the time data. The warning unit 40 is electrically coupled to the control unit 30, and includes a display module 41 for displaying the end of the shelf life of the product. In this embodiment, the display module is a flexible display so as to fit a variety of product appearances. In this embodiment, an electronic paper is given as an example of the display module 41. It should be noted here that the storage unit 10 of the first embodiment may be a CMOS RAM and may be integrated with the real-time clock in the same chip. Therefore, the invention is not limited to the disclosure of this embodiment.

Figure 2:
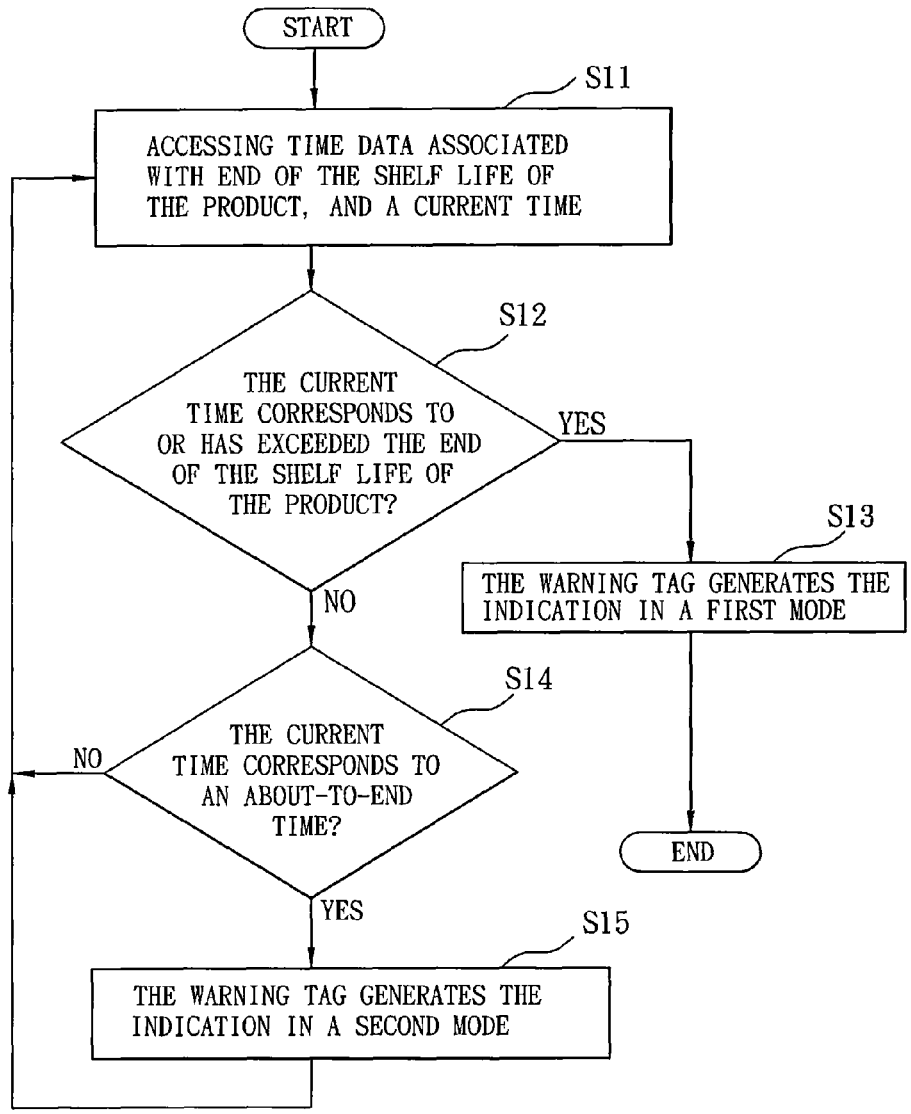
FIG. 2 is a flow chart illustrating a method for providing an indication relevant to shelf life of a product according to a first embodiment.

Referring to FIG. 2, when the warning tag 100 is disposed on the product, the control unit 30 may perform the following steps:

In step S11, the control unit 30 accesses the time data associated with the end of the shelf life of the product from the storage unit 10, and a current time from the clock unit 20.

In step S12, the control unit 30 makes a first determination as to whether the current time corresponds to or has exceeded the end of the shelf life of the product.

In step S13, when a result of the first determination is affirmative, it means that the product has reached or exceeded the end of the shelf life. The control unit 30 outputs the warning signal for controlling the warning unit 40 to display the end of the shelf life of the product in a first mode. For example, the end of the shelf life of the product is presented in red fonts. However, effect of the first mode is not limited to variation in color, and flashing effects and running light effects may be adopted so as to increase conspicuousness of the indication.

In step S14, when the control unit 30 determines that the current time does not correspond to and does not exceed the end of the shelf life of the product, the control unit 30 makes a second determination as to whether the current time corresponds to an about-to-end time which approaches but does not exceed the end of the shelf life of the product. In this embodiment, the about-to-end time is three days prior to the end of the shelf life of the product. For example, if the end of the shelf life of the product is Dec. 31, 2010, the about-to-end time is Dec. 28, 2010. However the about-to-end time is not limited to the disclosure herein. The about-to-end time is determined according to different products and different ends of the shelf life thereof.

In step S15, when the control unit 30 determines that the current time corresponds to the about-to-end time, the control unit 30 outputs the warning signal for controlling the warning unit 40 to display the end of the shelf life of the product in a second mode. For example, the end of the shelf life of the product is presented in yellow fonts so as to warn the consumer that the product is about to reach the end of the shelf life thereof. Subsequently, step S11 is repeated.

However, in step S14, when the control unit 30 determines that the current time does not correspond to the about-to-end time, the flow goes back to step S11. The control unit 30 may once again access the time data associated with the end of the shelf life of the product from the storage unit 10, and the current time from the clock unit 20.

It is noted that, effect of the second mode is not limited to variation in color. In this embodiment, aside from the end of the shelf life of the product, the product information displayed by the display module 41 may further include a bar code or other information such as a manufacturing date. Content displayed by the display module 41 may vary with different products.

In other words, the warning tag 100 is capable of detecting the end of the shelf life of the product on which the warning tag 100 is disposed, and actively warning the consumer about the end of the shelf life through variation in color and display by the electronic paper, so as to ensure consumer's safety in use. Furthermore, since the warning tag 100 of the present invention is disposed on the product and is not required to operate in conjunction with a barcode reader (not shown), the warning tag 100 is still capable of providing the indication relevant to shelf life of the product after purchase of the product by the consumer.

Additionally, the warning unit 40 may include an audio module 42 electrically coupled to the control unit 30, and the control unit 30 outputs another warning signal for controlling the audio module 42 to generate the indication in an audible form when the current time corresponds to the about-to-end time (such as step S14) or when the current time corresponds to or has exceeded the end of the shelf life of the product (such as step S12). The warning unit 40 may include the display module 41 and the audio module 42 at the same time so as to achieve an effect of dual warnings in visible and audible forms, such that the effect of warning the consumer about the end of the shelf life of the product is upgraded.

The warning tag 100 may further include a communication unit 50 electrically coupled to the control unit 30. The communication unit 50 may be a radio frequency identification (RFID) tag. By wirelessly transmitting updated data of the product information (including the shelf life, manufacturing date, etc.) to the communication unit 50 via a RFID reader (not shown) and storing the updated data of the product information in the storage unit 10, the product information stored in the storage unit 10 is updated or changed. Alternatively, the communication unit 50 may be a transmission interface to be electrically coupled to an external signal line (not shown) so as to update or change the product information stored in the storage unit 10. Hence, the invention is not limited to the disclosure in this embodiment.

Figure 3:
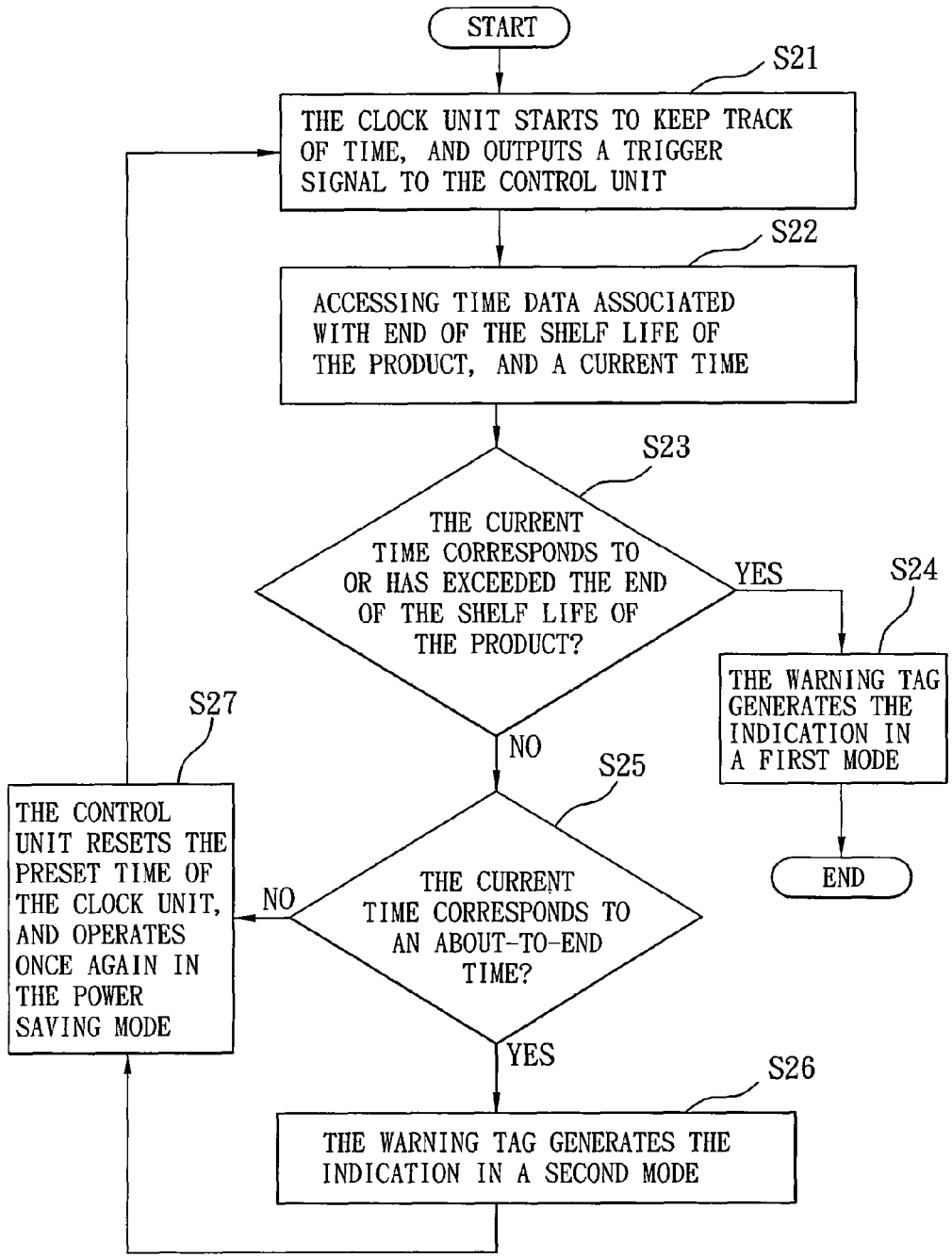
FIG. 3 is a flow chart illustrating a method for providing an indication relevant to shelf life of a product according to a second embodiment.

Referring to FIG. 1 and FIG. 3, a second embodiment of the warning tag 100 for providing an indication relevant to shelf life of a product according to the present invention is illustrated. In the first embodiment, the control unit 30 keeps accessing the current time generated by the clock unit 20 so as to determine whether the current time corresponds to the about-to-end time or the end of the shelf life of the product. The second embodiment differs from the first embodiment in the configurations that the control unit 30 makes determinations only when time track kept by the clock unit 20 meets the about-to-end time or the end of the shelf life of the product, and operates in a power saving mode at other times so as to save consumption of electric power. Detailed steps of the second embodiment are illustrated hereinafter.

In step S21, the clock unit 20 starts to keep track of time, and outputs a trigger signal to the control unit 30 when the track of time meets a preset time. While the clock unit 20 is keeping track of time, the control unit 30 operates in the power saving mode and does not perform any action so as to save electric power consumption of the control unit 30.

It should be noted here that, when the product is within a range of safe use (that is, the current time has not reached the about-to-end time), in the warning tag 100, only the clock unit 20 is keeping track of time and the rest of the units do not operate. The display module 41 displays the end of the shelf life of the product in an initial mode (for example, black). Since the display module 41 in this embodiment is an electronic paper, which has a characteristic that the electronic paper consumes electricity only when the electronic paper is switching states thereof, in step S21, only the clock unit 20 of the warning tag 100 is consuming electricity.

When the control unit 30 receives the trigger signal, the control unit 30 may operate in a working mode from the power saving mode and perform step S22. In step S22, the control unit 30 accesses the time data associated with the end of the shelf life of the product from the storage unit 10, and a current time from the clock unit 20.

The control unit 30 is configured to make a first determination as to whether the current time corresponds to or has exceeded the end of the shelf life of the product (step S23). The control unit 30 outputs the warning signal for controlling the warning unit 40 to display the end of the shelf life of the product in the first mode, when a result of the first determination is affirmative (step S24). When the current time does not correspond to or does not exceed the end of the shelf life of the product, the control unit 30 subsequently makes a second determination as to whether the current time corresponds to the about-to-end time (step S25). The control unit 30 outputs the warning signal for controlling the warning unit 40 to display the end of the shelf life of the product in a second mode when a result of the second determination is affirmative (step S26).

After the control unit 30 has controlled the warning unit 40 to display the end of the shelf life of the product in the second mode, the control unit 30 is configured to reset the preset time of the clock unit 20, and operates once again in the power saving mode after resetting the preset time (step S27). Subsequently, step S21 is performed that the clock unit 20 proceeds to keep track of time, and outputs the trigger signal when the track of time meets a next preset time (i.e., the reset preset time). Therefore, the control unit 30 of this embodiment makes the determinations as to whether the current time corresponds to the about-to-end time and whether the current time corresponds to the end of the shelf life of the product every interval of time, and is configured to operate in the power saving mode at other times. In this way, the warning tag 100 may be more power saving.

Furthermore, in step S21, the preset time of the clock unit 20 may be preset to be the about-to-end time, and in step S27, the control unit 30 may reset the preset time of the clock unit 20 to be the end of the shelf life of the product. Therefore, when the time track kept by the clock unit 20 meets the about-to-end time, the control unit 30 is awaken (i.e., to operate in the working mode), makes the display module 41 to display the end of the shelf life of the product in the first mode (for example, yellow), and shuts down once again (i.e., to operate in the power saving mode). The control unit 30 is awaken once more when the time track kept by the clock unit 20 meets the end of the shelf life of the product, and controls the display module 41 to display the end of the shelf life of the product in the second mode (for example, red). In other words, under the aforementioned setting, the control unit 30 operates in the working mode only at two time points of the about-to-end time and the end of the shelf life of the product, so that the warning tag 100 may be more power saving.

Returning to step S25, when the control unit 30 determines that the current time does not correspond to the about-to-end time, step S27 is performed. In step S27, the control unit 30 resets the preset time of the clock unit 20, and step S21 is performed. In step S21, the clock unit 20 proceeds to keep track of time, and outputs the trigger signal when the track of time meets the next preset time.

In summary, by means of disposing the warning tag 100 on the product, monitoring the end of the shelf life of the product, and providing the indication via the warning unit 40 at the about-to-end time and the end of the shelf life of the product, the consumer is reminded about the end of the shelf life of the product. Furthermore, after the consumer has purchased the product, the warning tag 100 is still capable of providing the indication relevant to the shelf life of the product.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for providing an indication relevant to shelf life of a product, said method to be implemented by a warning tag disposed on the product, said method comprising:
    (A) accessing time data associated with end of the shelf life of the product, and a current time;
    (B) making a first determination as to whether the current time corresponds to or has exceeded the end of the shelf life of the product;
    (C) configuring the warning tag to generate the indication in a first mode when a result of the first determination is affirmative;
    (D) when the result of the first determination is negative, making a second determination as to whether the current time corresponds to an about-to-end time which approaches but does not exceed the end of the shelf life of the product; and
    (E) configuring the warning tag to generate the indication in a second mode when a result of the second determination is affirmative.

2. The method as claimed in claim 1, further comprising, prior to step (A):
    (F) configuring the warning tag to keep track of time so as to generate the current time, and proceeding to step (A) when the current time generated by the warning tag matches a preset time.

3. The method as claimed in claim 2, further comprising, after step (E):
    (G) resetting the preset time and configuring the warning tag to perform step (F).

4. The method as claimed in claim 3, wherein, in step (D), step (G) is performed when the current time does not correspond to the about-to-end time.

* * * * *